June 1, 1954  J. R. JOHNSON  2,679,718
SICKLE GUARD FOR MOWING MACHINE CUTTER BARS
Filed July 9, 1951
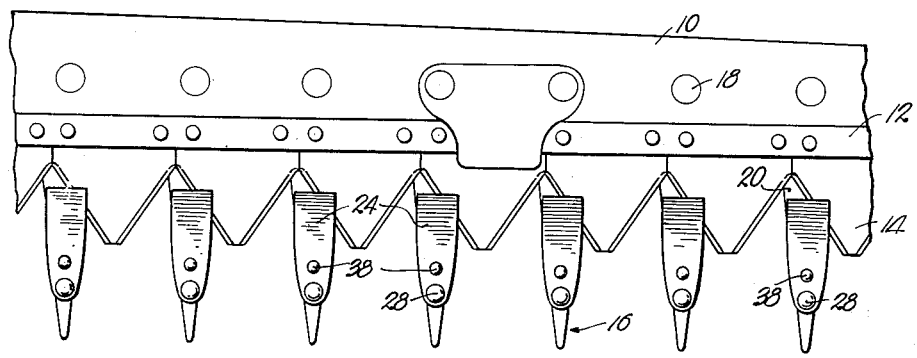
Fig. 1.
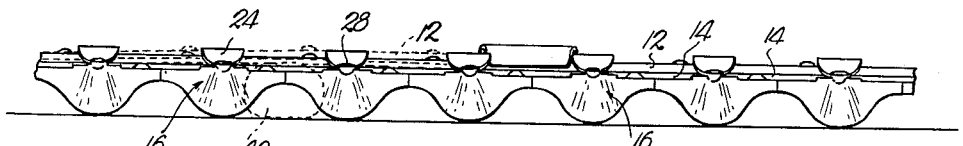
Fig. 2.
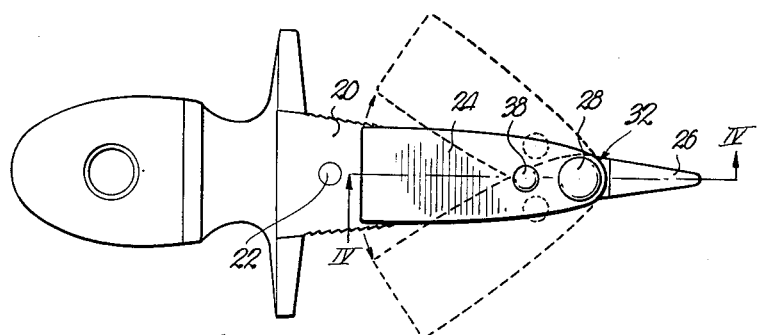
Fig. 3.
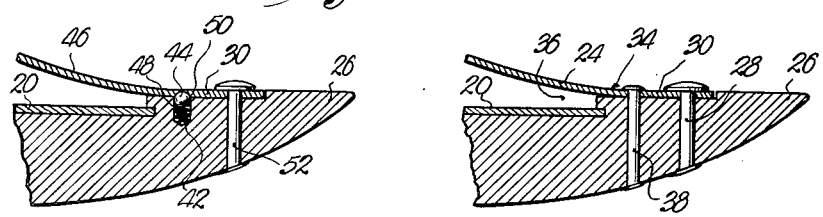
Fig. 5.   Fig. 4.
INVENTOR.
John R. Johnson
BY
ATTORNEY.

Patented June 1, 1954

2,679,718

UNITED STATES PATENT OFFICE 2,679,718

SICKLE GUARD FOR MOWING MACHINE CUTTER BARS

John R. Johnson, Kansas City, Mo.

Application July 9, 1951, Serial No. 235,840

1 Claim. (Cl. 56—310)

This invention relates to improvements in farm implements and particularly to harvesting machines having a cutter-bar provided with a reciprocable sickle, the primary object being to provide as an article of manufacture, a new and improved guard finger for the sections of the sickle.

Those skilled in this field are familiar with conventional cutter-bars for harvesters that include an elongated, reciprocable sickle having a plurality of substantially triangular-shaped sections, together with finger guards on the cutter-bar for the sections. Such guards normally ride along the ground and are pointed at the leading end thereof, there being a slot formed in each guard respectively for clearing the moving sickle.

A so-called "ledger plate" is removably mounted on the guard for cooperating with the sickle sections in providing a shearing action, and a plate normally integral with the guard overlies the sickle in spaced-relationship to the ledger plate.

Such finger guards have heretofore been quite satisfactory in horse-drawn implements, but upon advent of the tractor, a high degree of breakage has been experienced by most users. Such breakage is occasioned by small rocks or pebbles within the path of travel of the cutter-bar, causing the reciprocating sickle to rise relative to the bar and strike the overlying plate of the guards. Such plate is either broken or bent or the entire guard seriously damaged, necessitating replacement, and in a few instances, repair when possible. The speed of forward travel of tractor-drawn implements of this kind, as well as the speed of reciprocation of the sickle, aggravates the problem, making necessary the improvements of the present invention.

It is thus the most important object of the present invention to provide a finger guard that includes an overlying plate as aforementioned pivotally secured to the guard and provided with means for yieldably holding the same in a normal position so that the plate may be deflected by the sickle contacting the same, thereby avoiding breakage.

Another object hereof is to provide an improved finger guard as above set forth wherein the yieldable means for holding the swingable plate in a normal position, may consist either of a shear pin or alternately, a spring-loaded detent.

In the drawing:

Figure 1 is a fragmentary, top plan view of a harvester cutter-bar showing the improved finger guard of my present invention and embodying one form thereof.

Fig. 2 is a fragmentary, front elevational view thereof.

Fig. 3 is an enlarged top plan view of one of the guards per se.

Fig. 4 is a fragmentary, cross-sectional view taken on line IV—IV of Fig. 3; and Fig. 5 is a cross-sectional view similar to Fig. 4 illustrating a modified form of the invention.

A conventional cutter-bar 10, for various types of harvesters such as combines, binders, mowing machines and the like, is illustrated in Figs. 1 and 2 of the drawing. Bar 10 mounts a reciprocable sickle 12 having a plurality of removable, substantially triangular-shaped sections 14.

A number of finger guards, broadly designated by the numeral 16, are secured in spaced-apart relationship throughout the length of the bar 10 to the latter, by means of bolts 18. As is conventional, each finger guard 16 has a ledger plate 20 secured thereto by means of a rivet 22 for cooperating with the sections 14 in providing a shearing action. Plates 20 all underlie the sections 14 of sickle 12 and according to the present invention, an overlying guard plate 24 is secured to the guard 16 near pointed end 26 thereof for swinging movement on a substantially vertical axis, through the medium of a pin, bolt, rivet or the like 28. It is to be preferred that the upper face of guard 16 have a cavity 30 formed therein for receiving that part of the plate 24 which engages guard 16, thereby presenting a substantially flat, smooth, upper surface. Further, to the end that under certain conditions, plate 24 will swing on pin 28 as indicated by dotted lines in Fig. 3, the lowermost end of the plate 24 is preferably rounded as at 32. Plate 24 has a transverse line of bend as at 34 adjacent the forwardmost end of ledger plate 20 and from line of bend 34, plate 24 angles upwardly toward the normally rearmost end thereof. Consequently, plate 24 and ledger plate 20 diverge as the bar 10 is approached. A space 36 is presented between the plates 20 and 24 for clearing the reciprocating sickle 12.

Plate 24 is yieldably held in the normal position shown in Figs. 1 and 2 and by full lines in Fig. 3 by means of a shear pin 38, carried by the guard 16, between pin 28 and ledger plate 20 and extending upwardly through the plate 24. By virtue of such construction, if during use of a harvester with which the improvements hereof are adaptable, cutter-bar 10 passes over a rock 40 or other obstacle capable of passing between the fingers 16 and is engaged by the reciprocating sickle 12 as is quite common, then the consequent upward deflection of the sickle 12 will not operate to break any of the guards 16. If a section 14 engages and locks with a plate 24, then rather than breaking the guard 16 particularly adjacent its pointed end 26, or bending the same, pin 38 will be sheared and plate 24 swung from the normal position in either of the two directions shown by dotted lines in Fig. 3 on the pivot pin 28.

Alternately, as shown in Fig. 5 of the drawing, in lieu of shear pin 38, there may be provided a small opening extending downwardly from the cavity substantially in the same position as shear pin 38 in the case of the modification of Figs. 1 to 4 inclusive. Such opening 42 is adapted to receive a detent 44 in the nature of a small sphere that is held biased upwardly toward plate 46 by a coil spring 48 within opening 42. Plate 46 corresponds in all respects to the plate 24 except that the same has an indentation 50 adapted to normally receive the detent 44. The action is similar when a rock 40 engages sickle 12 to that of the modification of Figs. 1 to 4 inclusive except that the plate 46 is free to swing against the action of spring 48 and may thereafter be repositioned with detent 44 within the indentation 50.

Obviously, in the modification of Fig. 5, a pivot pin 52 is provided for pivotally mounting the plate 46 and corresponding to the pivot pin 28. Through use of the modification of Fig. 5, it is not necessary to make replacements as in case of shear pin 38, but conversely, the modification of Figs. 1 to 4 inclusive is advantageous because the plate 24 is more positively held in its normal operating position.

While details of construction may vary from those hereinabove set forth, such changes as fairly come within the spirit of the invention as defined by the scope of the appended claim, are contemplated hereby.

Having thus described the invention what is claimed as new and desired to be secured by Letters Patent is:

In a mowing machine having an elongated, normally horizontal cutter bar, and an elongated sickle carried by the cutter bar for rectilinear reciprocation longitudinally thereof, said sickle being provided with a series of cutter sections, the improvement of which comprises at least one finger guard secured to the bar and extending forwardly therefrom in underlying relationship to the sickle, there being a cavity in the uppermost face of the finger guard, the rearmost end of the cavity being open; an elongated guard plate having one end thereof resting in the cavity, said plate having a longitudinally convex uppermost face and extending upwardly and rearwardly from said end of the cavity, a vertical rivet extending through the finger guard and the plate adjacent said one end of the latter for securing the plate to the guard; and a vertical pin extending through the finger guard and the plate and secured thereto between the rivet and said end of the cavity for normally holding the plate against rotation on the rivet relative to the finger guard, the diameter of the pin being less than that of the rivet whereby the pin will shear when a rock or other hard obstacle lodges between a cutter section and the plate, and the plate will swing on the rivet to a position clearing the obstacle.

References Cited in the file of this patent

UNITED STATES PATENTS

| Number | Name | Date |
| --- | --- | --- |
| 770,892 | Crates | Sept. 27, 1904 |
| 843,629 | Pridmore | Feb. 12, 1907 |
| 1,104,240 | Barnes | July 21, 1914 |
| 1,944,644 | Henderson | Jan. 23, 1934 |
| 2,304,421 | Rogers | Dec. 8, 1942 |
| 2,627,156 | Carter | Feb. 3, 1953 |